United States Patent [19]

Ross et al.

[11] Patent Number: 5,395,866
[45] Date of Patent: Mar. 7, 1995

[54] MODIFIED ACRYLIC UNSATURATED POLYESTER RESIN

[75] Inventors: Louis R. Ross, Vadnais Heights; Matthew C. Kastl, Brooklyn Park, both of Minn.

[73] Assignee: Interplastic Corporation, Vadnais Heights, Minn.

[21] Appl. No.: 79,358

[22] Filed: Jun. 18, 1993

[51] Int. Cl.$^6$ .............................. C08L 67/06
[52] U.S. Cl. ..................... 523/512; 523/514; 523/515; 523/521; 525/25; 525/27; 525/44; 525/48; 525/445
[58] Field of Search ............ 525/44, 48, 445, 27, 525/25; 523/514, 515, 521, 512

[56] References Cited

U.S. PATENT DOCUMENTS

| | | | |
|---|---|---|---|
| 3,793,398 | 2/1974 | Hokamura | 260/835 |
| 3,983,185 | 9/1976 | Dorfman et al. | 260/863 |
| 4,228,251 | 10/1980 | Maekawa | 525/168 |
| 4,233,432 | 11/1980 | Curtis | 525/49 |
| 4,309,519 | 1/1982 | Obara et al. | 525/445 |
| 4,447,577 | 5/1984 | Bayha | 524/845 |
| 4,499,142 | 2/1985 | Kingston | 428/331 |
| 4,551,489 | 11/1985 | Bayha | 523/501 |
| 4,626,570 | 12/1986 | Gardner | 525/12 |
| 4,888,393 | 12/1989 | Cesare et al. | 525/205 |
| 4,893,055 | 1/1990 | Fuzii | 525/46 |
| 5,082,878 | 12/1992 | Bansleben et al. | 523/203 |
| 5,089,544 | 2/1992 | Ross et al. | 523/511 |

OTHER PUBLICATIONS

Lawrence, J. R., *Polyester Resins*, p. 26, Reinhold Publishing Corp. 1960.

*Primary Examiner*—Patricia A. Short
*Attorney, Agent, or Firm*—Nawrocki, Rooney & Sivertson

[57] ABSTRACT

A resin composition including a modified acrylic unsaturated polyester resin composition comprising a maleic dicyclopentadienyl glycol polyester which is dissolved in a mixture of styrene monomer and methylmethacrylate monomer. The maleic dicyclopentadienyl glycol polyester is the reaction product of a glycol or mixture of glycols, an ethylenically unsaturated polycarboxylic acid moiety and dicyclopentadiene. The glycol utilized as a reactant preferably has a structure defined by: $H-(OCHR-CH_2)_n-OH$ wherein R is H or $CH_3$ and n is 1-10. The concentration of unsaturated polyester is preferably about 40 weight percent to about 75 weight percent in the resin composition. The concentration of styrene monomer ranges from about 5 weight percent to about 40 weight percent, while the concentration of methylmethacrylate monomer ranges from about 5 weight percent to about 45 weight percent.

13 Claims, No Drawings

MODIFIED ACRYLIC UNSATURATED POLYESTER RESIN

TECHNICAL FIELD

The present invention relates to polymer compositions. More narrowly, the present invention is directed to low-shrink unsaturated polyester polymer formulations for use in composites. The composite compositions of the present invention are curable at temperatures of 100° C. or lower and provide a Class A rated surface without the use of low-shrink or low-profile additives.

BACKGROUND OF THE INVENTION

Unsaturated polyester resin compositions are finding widespread use in industry for manufacturing parts. One particular area, the automotive industry, is increasingly utilizing unsaturated polyester resins to manufacture body panels. The use of such resins reduces weight and eliminates corrosion problems associated with metal body panels. In such application, as with others, one criteria determinant as to whether or not a polyester resin composition is satisfactory is whether the surface smoothness of the finished part is adequate.

It is generally recognized that the surface quality of a molded article may be measured by optical enchancement technology to measure surface waviness. For the automotive industry, the surface quality must meet a stringent standard defined generally as a Class A surface. A known instrument, presently commercially available, for measuring surface waviness is a Diffracto (TPS-2) Test Plaque Station, available from Diffracto Ltd., Windsor, Ontario. To be qualified as Class A, the surface must have a Diffracto TPS-2 reading of less than 100, as generally recognized in the molding industry.

It is further recognized that the surface quality may be improved after molding the article by grinding, buffing, coating, or other means. However, it is clear that such added manufacturing steps add significantly to the cost of manufacture. It is preferable that an article satisfy the Class A surface requirements as molded. To achieve this, the composition must be capable of conforming to the surface of the mold throughout the curing process.

It is known that unsaturated polyester resins are subject to shrinkage during curing. The adverse effect on surface quality is also well documented. The shrinkage is known to cause fractures, warpage, sink, and other aspects of poor surface quality. Thus, much development work has been directed to reducing or eliminating the shrinkage during curing of unsaturated polyester resin compositions to improve the surface quality. Most of this work has been directed to the use of low-profile and low-shrink additives.

In formulating an unsaturated polyester resin composition, a second important criterium is the curing temperature. Low temperature curing resins are generally used in resin transfer molding (RTM). These resins generally cure at temperatures of room temperature up to approximately 71° C.

For the RTM process, molds may be manufactured from products such as Epoxy, other polyesters, or gel-coated polyesters. These molding materials generally restrict molding temperatures to approximately 71° C. or lower. The advantages of these molding materials are the low cost, less weight and short time of fabrication.

In contrast, higher temperature curing resins, relative to RTMs, require molds which are manufactured from steel or other metals. Well-known higher temperature tooling materials include aluminum, Kirksite alloy, and steel. The disadvantage of these molds is the cost associated with fabrication.

An unsaturated polyester resin composition is generally classified on the basis of its curing temperature. For purposes here, these categories include low temperature curing polymers which are capable of resin transfer molding in contrast to higher temperature curing formulations which cure above approximately 71° C. Within each category, the shrinkage is also an important criterium for successful molding of Class A surfaces.

Low temperature curing unsaturated polyester resin compositions are known to be produced utilizing saturated dicarboxylic acids such as isophthalic acid or its derivatives or dicyclopentadiene (DCPD) as raw materials. They are generally believed unsatisfactory for molding Class A surfaces. It is further believed that the use of low-shrink additives or low-profile additives to reduce shrinkage is unsatisfactory with these resins. Although the morphology of a curing polyester is maintained with low-shrink additives, the reduction in shrinkage is insufficient for molding Class A surfaces especially at the low temperatures usually used in RTM.

Low-profile additives lead to a significant, easily recognized morphology. These additives cause a phase separation that leads to a microscopic void formation so that shrinkage is relieved internally. High reactivity unsaturated polyester resins, for example those with little or no saturated dicarboxylic acids, or dicyclopentadiene, are well known to be needed for low-profile systems. A recognized problem with low-profile resins is the need to be cured at well controlled and higher temperatures. The high temperature and high reactivity resins are needed so that the morphological changes (i.e., phase separation and void formation) are able to take place. These temperatures generally exceed 71° C. These systems are well suited for sheet molding compounds, bulk molding compounds, and other processes where the molding is done in metal molds.

It is well-recognized in the thermoset industry that unsaturated polyesters can be mixed with monomers. Kingston (U.S. Pat. No. 4,499,142) discloses an isophthalic neopentyl glycol polyester which utilizes both methylmethacrylate and styrene as a cross-linking monomer. Kingston, however, discloses curing the composition of his invention at temperatures of 280° F. (138° C.). Kingston discloses that the use of methylmethacrylate and styrene substantially reduce smoke production at elevated temperatures when such particular cross-linking monomer mixtures are used in combination with dimethylmethylphosphonate. As documented in the tests included in Example I of the Experimental section such resin does not provide shrinkage control at RTM curing temperatures.

Obara et al. (U.S. Pat. No. 4,309,519) describe a process for producing a flyback transformer that will not delaminate or shrink when exposed to high voltage. The process includes treating the flyback transformer with a low-shrinkage resin composition.

The low-shrinkage resin composition includes a polyester produced by an addition-condensation reaction of a partially esterified dicyclopentadiene (DCPD) carboxylic acid. The DCPD carboxylic acid is obtained by reacting at 150° C. or lower, a reactant group that includes DCPD, maleic acid, and water or hydroxylated DCPD and maleic anhydride. The reactant group may also include a hydroxylated DCPD and maleic anhydride, with one or more polyhydric alcohols.

The low-shrinkage resin composition is also described as including a monomer having one or more vinyl groups such as styrene and a low-shrinkage agent. The low-shrinkage agent is described functionally as an agent that makes the resulting resin composition having a low-shrinkage. Examples of such an agent include polystyrene, a polyvinyl acetate, a saturated polyester and the like. The curing of a coated article is disclosed as including curing at 25° C. for 2 hours and 105° C. for 7 hours.

Bayha (U.S. Pat. No. 4,447,577) discloses an emulsion of a polyester that is formed from dicyclopentadiene. The emulsion includes up to 75–80% water by weight. The polyester is described as being formed from dicyclopentadiene, maleic acid or maleic anhydride, and a compound which contains at least two alcoholic hydroxyl groups and which may be an alcohol, a glycol, or a polyol having at least three alcoholic hydroxyl groups. The patent also includes a step of dissolving this resin with 50% by weight of styrene. The resin is curable at room temperature. Linear shrinkage is indicated to be $5.8 \times 10^{-3}$ inches/inch, or 0.58%, recognized as far outside parameters for producing a Class A surface.

Bayha (U.S. Pat. No. 4,551,489) also describes an emulsion that includes 50–80% by weight of water and 50–80% by weight of a polyester that is formed from dicyclopentadiene. The emulsion is also described as including a curing agent and a cross-linking agent for the polyester. A preferred cross-linking agent is described as styrene. The polyester is described as being made from maleic acid or maleic anhydride that is reacted with dicyclopentadiene to produce an intermediate moiety. The reaction is also described as preferably including a heat transfer agent such as a glycol. As recognized above, the shrinkage upon curing is too extensive to result in Class A surface.

Gardner (U.S. Pat. No. 4,626,570) describes a polyester resin that has features of being low-shrinking and low viscosity. The resin is made by contacting a material such as maleic acid or maleic anhydride with an organic polyol for a time and temperature sufficient to form a composition having a carboxylic acid terminated polyester. Further, a thermoplastic low-profile additive is added for shrinkage control and considered an essential element. As recognized in Table A of the patent, the resins of Gardner must be cured at temperatures of 138° C. to 152° C. to achieve proper curing.

Bansleben et al. (U.S. Pat. No. 5,082,878) disclose a shrinkage control agent for unsaturated polyester resin systems that are copolymers of vinyl versatate and vinyl acetate. The patent describes the unsaturated polyesters themselves as being prepared with anhydrides that include maleic anhydride and polyols that include glycol. The patent also describes the use of derivatives of dicyclopentadiene and glycerol. The patent further describes the use of styrene as a suitable cross-linking monomer.

The patent describes its shrink control agent as copolymers of fatty alkyl vinyl esters and short chain vinyl esters. By "fatty alkyl vinyl esters" the patent includes vinyl esters with a fatty alkyl chain of about 9 to 11 carbon atoms. See Col. 3, lines 26–42.

Ross et al. (U.S. Pat. No. 5,089,544) disclose a resin system having four components that reduce the possibility of shrinkage and delamination. The first component includes an unsaturated polyester. The unsaturated polyester is described as being made of materials such as propylene glycol, water, DCPD and maleic anhydride. The second component is a low-profile thermoplastic polymer. Methylmethacrylate polymer is included within this low-profile thermoplastic polymer group. The third component is an unsaturated monomer which copolymerizes with the unsaturated polyester. The styrene monomer is included within this group. The fourth component is a polyoxyethane substitute. Molding cycles are disclosed as requiring temperatures of 121° C.–176° C.

Accordingly, the need exists for an unsaturated polyester resin composition capable of being resin transfer molded. The resin composition should be curable at temperatures below 71° C., yet provide a Class A surface as molded. As documented above, it is generally recognized that low-profile additives require curing temperatures above those suitable for resin transfer molding and thus the need exists for a low-shrinkage resin composition which does not require such additives.

The present invention addresses these as well as other problems associated with existing resin transfer molding compounds. The present invention also offers further advantages over the prior art and solves problems associated therewith.

SUMMARY OF THE INVENTION

The present invention is a resin composition and formulation for composite manufacturing utilizing a resin composition that is able to be cured with a very low shrinkage. The present composition does not require the inclusion of low-shrinkage or low-profile additives in the resin in order to accomplish low-shrinkage. Further, although it is recognized that successful resin systems for producing a smooth surface have been developed at curing temperatures above 100° C., the present resin composition and composite is curable at temperatures below 71° C.

Thus, the resin compositions of the present invention may be utilized in resin transfer molding processes with low temperature molds tooled from epoxy or polyester. The resulting molded article satisfies the requirements of a Class A system without the associated cost of high temperature molds and molding processes.

In its broadest sense, the resin of the present invention is an unsaturated polyester made up of dicyclopentadiene, maleic anhydride or its derivatives, such as maleic acid or fumaric acid, and glycols. The unsaturated polyester is mixed with or dissolved in both styrene monomer and methylmethacrylate monomer.

In one embodiment, the resin composition includes a modified acrylic unsaturated polyester resin composition comprising a maleic dicyclopentadienyl glycol polyester which is dissolved in a mixture of styrene monomer and methylmethacrylate monomer.

The maleic dicyclopentadienyl glycol polyester is the reaction product of a glycol or mixture of glycols, an ethylenically unsaturated polycarboxylic acid moiety and dicyclopentadiene. Processes for manufacturing unsaturated polyesters are generally known, an example of which is described in the hereinafter which is preferable for manufacturing resins of the present invention.

The glycol utilized as a reactant preferably has a structure defined by:

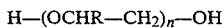

wherein R is H or $CH_3$ and n is 1–10. It is recognized that the above glycol can include mixtures of glycols satisfying the general formula. A preferred combination of glycols includes ethylene glycol in combination with diethylene glycol. A preferred ratio of such glycols includes about 20 to about 30 weight percent ethylene glycol and about 72 to about 80 weight percent diethylene glycol. The total concentration of glycols in the reaction mixture preferably ranges from about 5 weight percent to about 45 weight percent glycols.

The ethylenically unsaturated polycarboxylic acid moiety can include such compounds as maleic anhydride, maleic acid, or fumaric acid. A mixture of any of these is also recognized as within the scope of the present invention. The concentration of ethylenically unsaturated polycarboxylic acid moiety preferably ranges from about 15 weight percent to about 55 weight percent.

The third component of the reaction product is dicyclopentadiene. The concentration of dicyclopentadiene ranges from about 15 weight percent to about 60 weight percent.

The unsaturated polyester of the present invention, as previously stated, is dissolved in a mixture of styrene monomer and methylmethacrylate monomer. The concentration of unsaturated polyester is preferably about 40 weight percent to about 75 weight percent in the resin composition. In such composition, the concentration of styrene monomer ranges from about 5 weight percent to about 40 weight percent, while the concentration of methylmethacrylate monomer ranges from about 5 weight percent to about 45 weight percent.

Applicants have found that resins within these compositional ranges exhibit very low shrinkage without the use of either low-profile or low-shrinkage additives. The systems may be molded in a broad temperature range and used for room temperature molding conditions. This aspect allows for use in resin transfer molding, and other applications of various molding temperatures.

It is recognized that the reaction mixture can include up to about 10 weight percent water.

The resin composition is typically used in a formulation for composite manufacturing. The resin is utilized in combination with fillers, promoters and initiators which are generally recognized in industry for use in forming composites with unsaturated polyester resins.

A typical formulation of a resin composition would include about 30 to about 99 weight percent resin in combination with 0 to about 85 weight percent filler, 0 to about 2 weight percent promoter and 0 to about 7 weight percent initiator. In addition to these basic ingredients, about 5 to about 75 weight percent of reinforcement may be incorporated. A thermoplastic additive could also be incorporated in a compositional range from about 0 to about 20 weight percent. These compounds are generally known and recognized in the art of unsaturated polyester resins.

The preferred fillers are calcium carbonate and/or alumina. A preferred initiator is methylethylketone and 2, 4 pentanedione peroxide. Preferred promoters include 12 percent Cobalt Chem-all, Cobalt Neodecanotate.

Suitable reinforcement materials can include ceramic fibers, polyethylene teraphthalate filament, graphite fibers, boron fibers, carbon fibers and metal filaments. A preferred composite reinforcement includes glass fibers which include woven roving, continuous strand mat and chopped strand mat.

It has been discovered that resins incorporating the above composition and utilized in formulations to produce composites provide shrinkage of surprisingly much lower degree than previous resins. The present resins do not require the use of low-shrink or low-profile additives. As documented in the Experimental section, the resin, as utilized in the above composition is able to be molded to give composites with a Class A surface under conditions amenable to resin transfer molding. The compositions allow production of a Class A surface at a significantly reduced cost relative to known resins capable of accomplishing the same surface quality.

These and various other advantages and features of novelty which characterize the present invention are pointed out with particularity in the claims annexed hereto and forming a part hereof. However, for a better understanding of the invention, its advantages, and the object obtained by its use reference should be made to the accompanying descriptive matter and experimental data in which there are illustrated and described preferred embodiments of the present invention.

DETAILED DESCRIPTION OF THE INVENTION

Detailed embodiments of the present invention are disclosed herein. However, it is to be understood that the disclosed embodiments are merely exemplary of the present invention which may be embodied in various systems. Therefore, specific details disclosed herein are not to be interpreted as limiting, but rather as a basis for the claims and as a representative basis for teaching one of skill in the art to variously practice the invention.

In one embodiment, the resin composition includes a modified acrylic unsaturated polyester resin composition comprising a maleic dicyclopentadienyl glycol polyester which is dissolved in a mixture of styrene monomer and methylmethacrylate monomer.

The maleic dicyclopentadienyl glycol polyester is the reaction product of a glycol or mixture of glycols, an ethylenically unsaturated polycarboxylic acid moiety and dicyclopentadiene. Processes for manufacturing unsaturated polyesters are generally known, an example utilized in producing resins of the present invention is described below.

The glycol utilized as a reactant preferably has a structure defined by:

wherein R is H or $CH_3$ and n is 1–10. It is recognized that the above glycol can include mixtures of glycols satisfying the general formula. A preferred combination of glycols includes ethylene glycol in combination with diethylene glycol. A preferred ratio of such glycols includes about 20 to about 30 weight percent ethylene glycol and about 72 to about 80 weight percent diethylene glycol. The total concentration of glycols in the reaction mixture preferably ranges from about 5 weight percent to about 45 weight percent glycols.

The ethylenically unsaturated polycarboxylic acid moiety can include such compounds as maleic anhydride, maleic acid, or fumaric acid. A mixture of any of these is also recognized as within the scope of the present invention. The concentration of ethylenically unsaturated polycarboxylic acid moiety preferably ranges from about 15 weight percent to about 55 weight percent.

The third component of the reaction mixture is dicyclopentadiene. The concentration of dicyclopentadiene ranges from about 15 weight percent to about 60 weight percent.

The unsaturated polyester of the present invention, as previously stated, is dissolved in a mixture of styrene monomer and methylmethacrylate monomer. The concentration of unsaturated polyester is preferably about 40 weight percent to about 75 weight percent in the resin composition. In such composition, the concentration of styrene monomer ranges from about 5 weight percent to about 40 weight percent, while the concentration of methylmethacrylate monomer ranges from about 5 weight percent to about 45 weight percent.

Applicants have found that resins within these compositional ranges exhibit very low shrinkage without the use of either low-profile or low-shrinkage additives. The systems may be molded in a broad temperature range and used for room temperature molding conditions. This aspect allows for use in resin transfer molding, and other applications at various molding temperatures.

It is recognized that the reaction mixture can include up to about 10 weight percent water.

Several alternative resin compositions within the scope of the above general formulation have been recognized as particularly useful. These alterative resin formulations are considered preferable in practicing the invention. The alternative resin formulations are documented below. Concentrations are expressed in weight percent in all instances.

Resin Formulation 1

1. About 40–75% of an unsaturated polyester which is the reaction product of:
   a. at least about 5% but not more than about 45% glycols with the structure: H—(OCH$_2$—CH$_2$-)$_n$—OH where n is 1–10,
   b. no more than 10% water
   c. at least about 15% but not more than about 60% dicyclopentadiene
   d. at least about 10% but not more than about 55% maleic anhydride
2. About 5–40% styrene monomer
3. About 5–45% methylmethacrylate monomer

Resin Formulation 2

1. About 50–70% of an unsaturated polyester which is the reaction product of:
   a. at least about 5% but no more than about 45% glycols with the structure: H—(OCHR—CH$_2$-)$_n$—OH where R is H or CH$_3$ and n is 1–10,
   b. no more than about 10% water
   c. at least about 15% but not more than about 60% dicyclopentadiene
   d. at least about 10% but not more than about 55% maleic anhydride
2. About 10–30% styrene monomer
3. About 10–30% methylmethacrylate monomer

Resin Formulation 3

1. About 50–70% of unsaturated polyester which is the reaction product of:
   a. at least about 5% but no more than about 45% glycols with the structure: H—(OCH$_2$—CH$_2$-)$_n$—OH where n is 1–10,
   b. no more than about 10% water
   c. at least about 15% but not more than about 60% dicyclopentadiene
   d. at least about 10% but not more than about 55% maleic anhydride
2. About 10–30% styrene monomer
3. About 10–30% methylmethacrylate monomer

Resin Formulation 4

1. About 60% an unsaturated polyester made up of:
   a. 18% glycols with the structure: H—(OCH$_2$—CH$_2$-)$_n$—OH where n is 1–10 and mixtures thereof
   b. 7% water
   c. 43% dicyclopentadiene
   d. 32% maleic anhydride
2. 20% styrene monomer
3. 20% methylmethacrylate monomer The resin compositions disclosed above are typically used in a formulation for composite manufacturing. A description of the type of formulation that can be used is:

| INGREDIENT | WEIGHT PERCENT |
|---|---|
| Resin | 30–99 |
| Filler | 0–85 |
| Promoter | 0–2 |
| Initiator | 0–7 |

Composites made from this invention have been found to have the following description:

| INGREDIENT | WEIGHT PERCENT |
|---|---|
| Resin | 20–99 |
| Filler | 0–85 |
| Promoter | .05–2 |
| Initiator | .3–7 |
| Reinforcement | 5–75 |

An alternative formulation for composition manufacturing incorporating a thermoplastic additive can include:

| INGREDIENT | WEIGHT PERCENT |
|---|---|
| Resin | 30–99 |
| Thermoplastic additive | 0–20 |
| Filler | 0–85 |
| Promoter | 0–2 |
| Initiator | 0–7 |

Composites made from this formulation have been found to include the following composition:

| INGREDIENT | WEIGHT PERCENT |
|---|---|
| Resin | 20–99 |
| Thermoplastic additive | 0–15 |
| Filler | 0–85 |
| Promoter | .05–2 |
| Initiator | .3–7 |

| INGREDIENT | WEIGHT PERCENT |
| --- | --- |
| Reinforcement | 5-75 |

The fillers that may be used include hydrous aluminosilicate (clay), alumina, silica, mica, calcium sulfate, carbon black, talc, and organic fillers such as nutshell flours, etc. The preferred fillers are calcium carbonate and/or alumina. The specific filler used in Experimental Examples is Huber W-4 obtained from J. M. Huber Corporation, St. Louis, Mo.

The suitable initiators that may be used are well known and are exemplified by dibenzoyl peroxide (BPO), cumyl (cumene) hydroperoxide and methyl ethyl ketone peroxide, as well as Azo compounds. Preferred examples are: methyl ethyl ketone, (Lupersol DDM-9, Autochem NorthAmerica Inc., Buffalo, N.Y.).

The suitable promoters/accelerators are: cobalt naphthanate, cobalt octoate, certain metal salts such as copper, vanadium, calcium, manganese, potassium and the like. Certain amines may also be used in combination with the metal compounds or alone. These include but are not limited to N,N-diethylaniline, diethylamine, diethanolamine, N,N-dimethylparatoluidine, methylacetoacetate, and the like.

The preferred promoters/accelerators used in Experimental Examples include:
- 12% Cobalt Chem-All, Cobalt neodecanoate, Mooney Chemicals, Franklin, Pa.
- N,N Dimethylaniline, Buffalo Color Corporation, Parsippany, N.J.
- 2,4 Pentanedione, Union Carbide, Danbury, Conn.
- N,N Dimethylacetoacetamide, Eastman Chemical Company, Kingsport, Tenn.

Suitable reinforcements can include: ceramic fibers, PET filaments, graphite fibers, carbon fibers, boron fibers, and metal filaments. Preferred composite reinforcements include, but are not limited to: glass fibers (woven roving, continuous strand mat, and chopped strand mat) available from suppliers such as, Owens Corning, Toledo, Ohio—PPG, Pittsburgh, Pa.—Schuller International, Toledo, Ohio—GAF, Nashville, Tenn.—Certainteed, Wichita Falls, Tex.

The processes for producing a polyester resin of the present invention are generally known. It is believed other known methods will satisfactorily produce the resin compositions of the present invention. One such well known method, which has been utilized by applicants, includes charging one mole of maleic anhydride, or other ethylenically unsaturated dicarboxylic acid moiety, along with one mole of water and one mole of dicyclopentadiene into a reactor equipped with heating, a distillation column to remove low boiling distillate and a nitrogen sparge. The temperature within the reactor is held below 150° C.

Forty-five minutes after an exotherm has occurred, a blend of 0.2 moles of ethylene glycol and 0.4 moles of diethylene glycol are added and the temperature is increased to 210° C. After approximately two moles of water are removed and the polymer molecular weight has reached approximately 1,000, the product is dissolved in the monomers, to form the polyester resin. The monomers utilized in the present invention are styrene monomer and methylmethacrylate monomer.

Formulations for composite manufacturing utilizing the resins disclosed have been found to have surprisingly much lower shrinkage than previous resins with or without low-profile or low shrink additives when molded by RTM at temperatures less than 71° C. It was unexpected that this resin was able to be molded to give composites with Class A surface quality as molded. Comparative tests documenting the reduction in shrinkage and the ability to produce a Class A surface as molded of formulations of the present invention are included below. Further, experiments utilizing prior art compositions are documented to provide a comparative basis under duplicate experimental conditions.

Experimental

EXAMPLE I

A resin was prepared using the following ingredients and method disclosed above:
1. 60% of an unsaturated polyester made up of glycols with the structure: $H(OCH_2CH_2)_n$ where $n=1-10$, water, dicyclopentadiene, and maleic anhydride.
2. 20% styrene monomer
3. 20% methylmethacrylate monomer The unsaturated polyester was the reaction product of 43% dicyclopentadiene, 32% maleic anhydride, 7% water, and 4% ethylene glycol, and 14% diethylene glycol.

The resin was used in the following formulation for composite molding:

| INGREDIENT | WEIGHT PERCENT |
| --- | --- |
| Resin | 58.4 |
| Filler | 40.0 |
| Promoter | 0.6 |
| Initiator | 1.0 |

This formulation was used to prepare an RTM composite made up of:

| INGREDIENT | WEIGHT PERCENT |
| --- | --- |
| Resin | 43.0 |
| Filler | 29.5 |
| Promoter | 0.4 |
| Initiator | 0.7 |
| Fiberglass reinforcement | 26.4 |

This composite was prepared in a 12 inch by 18 inch mold with a plate glass surface. Four layers of 1.5 oz. continuous strand mat and four layers of two mil surfacing veil were placed in the mold and then the mold was clamped shut. The mold was heated on one surface to 55° C.

The resin portion of the matrix was promoted with 0.4% cobalt neodecanoate solution, (Mooney Chem All), 0.4% N,N-dimethylanaline, 0.1% 2,4-pentanedione, 0.1% dimethylacetoamide. Initiator MEKP (DDM-9) was then added and the composition was pumped into the mold through a sprue port using a Glas Craft Hypa Ject 3 resin injection system. The filler utilized was calcium carbonate. The fiberglass reinforcement was continuous strand mat. The composition was allowed to cure in the mold for 20 minutes. After a minimum of 24 hours from molding the shrinkage as measured along the length of the composite was 0.052%. The surface quality as measured on a Diffracto TPS-2 (manufactured by Diffracto Limited of Windsor, Ontario, Canada) yielded a Wf reading of 60 (Class A = <100).

An RTM composite made in the above mold with the same formulation under the same conditions, only with a standard RTM resin prepared with isophthalic acid had a linear shrinkage of 0.19%. The surface quality of the composite was too poor to be measured on a Diffracto TPS-2. The difference between these two tests clearly show that compositions utilizing isophthalic acid and methylmethacrylate do not have acceptable low-shrinkage. Additionally, an RTM composite made in the same mold with the same formulation under the same conditions, except the methylmethacrylate portion was replaced with styrene monomer. The resulting composite had a linear shrinkage of 0,119%. The surface quality as measured on a Diffracto TPS-2 (Manufactured by Diffracto Limited of Windsor, Ontario, Canada) yielded a $W_f$ reading of 939. This result documents the poor result achieved when one substitutes styrene for methylmethacrylate. They are not interchangeable.

EXAMPLE II

A resin was prepared using the following ingredients utilizing the method disclosed above:
  60% an unsaturated polyester made up of glycols with the structure: $H(OCH_2CH_2)_n$ where $n=1-10$, water, dicyclopentadiene, and maleic anhydride.
  2. 20% styrene monomer
  3. 20% methylmethacrylate monomer The unsaturated polyester was the reaction product of 43% dicyclopentadiene, 32% maleic anhydride, 7% water, and 4% ethylene glycol, and 14% diethylene glycol.

The resin was used in the following formulation for composite molding:

| INGREDIENT | WEIGHT PERCENT |
| --- | --- |
| Resin | 48.5 |
| Filler | 50.0 |
| Promoter | 0.5 |
| Initiator | 1.0 |

This formulation was used to prepare an RTM composite made up of:

| INGREDIENT | WEIGHT PERCENT |
| --- | --- |
| Resin | 40.4 |
| Filler | 41.7 |
| Promoter | 0.4 |
| Initiator | 0.8 |
| Fiberglass reinforcement | 16.7 |

The filler utilized was calcium carbonate, while the fiberglass reinforcement was continuous strand mat. This composite was prepared in a 12 inch by 18 inch mold with a plate glass surface. Three layers of 1.5 oz. continuous strand mat and four layers of two mil surfacing veil were placed in the mold and then the mold was clamped shut. The mold was heated on one surface to 55° C.

The resin portion of the matrix was promoted with 0.4% cobalt neodecanoate solution, (Mooney Chem All) 0.4% N,N-dimethylanaline, 0.1% 2,4-pentanedione, 0.1% dimethylacetoamide. Initiator, MEKP (DDM-9) was then added and the composition was pumped into the mold through a sprue port using a Glas Craft Hypa Ject 3 resin inject system. The composite was allowed to cure for 20 minutes. After a minimum of 24 hours after molding the shrinkage was measured along the length of the composite and was determined to be 0.088%. The surface quality as measured on a Diffracto TPS-2 (Manufactured by Diffracto Limited of Windsor, Ontario, Canada) yielded a $W_f$ reading of 60.

An RTM composite was made in the same mold with the same formulation under the same conditions, only with a standard RTM resin prepared with isophthalic acid. The linear shrinkage was 0.145%. The surface quality of the composite was too poor to be measured on a Diffracto TPS-2. This comparative test documents the inability of isophthalic based resins utilizing methymethacrylate as a cross-linker to provide a low-shrink composition.

In addition, an RTM composite was made in the same mold with the same formulation under the same conditions, only with a standard RTM resin prepared with the base polymer of the first composition of this example replacing the methylmethacrylate portion with styrene monomer. The linear shrinkage was 0.200%. The surface quality as measured on a Diffracto TPS-2 (Manufactured by Diffracto Limited of Windsor, Ontario, Canada) yields a $W_f$ reading of 212. This result documents the non-interchangeability of styrene and methylmethacrylate even though both are recognized as crosslinkers.

EXAMPLE III

Linear shrinkage was measured by curing, at room temperature, numerous resins in a triangular mold 50 centimeters in length. A suitable mold release was applied to the mold surface to allow the curing resin to shrink in an unrestricted manner. The test was performed by catalyzing 100 grams of resin with MEK peroxide and then pouring the resin into the mold. The length of the molded casting was measured a minimum of 24 hours after curing. Shrinkage was computed as: $50 - \text{cured casting length} = (\text{mm}) \times 2$. The resin composition described in example one was cured with 0.4% cobalt neodecanoate solution, (Mooney Chem All) 0.4% N,N-dimethylanaline, 0.1% 2,4-pentanedione, 0.1% dimethylacetoamide. Initiator, MEKP (DDM-9) was then added at the level of 1.0% and the initiated resin was poured into the mold. It had a linear shrinkage of 0.6 to 1.0 percent. This compares to a linear shrinkage of 1.7 to 2.8% for numerous RTM resins which include orthophalic resins, isophthalic resins, dicyclopentadiene resins, terephthalic resins and vinyl ester resins cured under identical conditions.

New characteristics and advantages of the invention covered by this document have been set forth in the foregoing description. It will be understood, however, that this disclosure is, in many respects, only illustrative. Changes may be made in details, particularly in compositional ranges of certain components, without exceeding the scope of the invention. The scope of the invention is, of course, defined in the language in which the appended claims are expressed.

What is claimed is:
1. An unsaturated polyester resin comprising:
  (a) about 50 weight percent to about 70 weight percent of an unsaturated polyester, said unsaturated polyester including the product of reacting dicyclopentadiene, an ethylenically unsaturated carboxylic acid moiety and glycol in concentrations of,

(1) about 5 weight percent to about 45 weight percent glycols, said glycols having a structure defined by:

$$H-(OCHR-CH_2)_n-OH$$

wherein R is H or $CH_3$ and n is 1–10;

(2) about 10 weight percent to about 55 weight percent of an ethylenically unsaturated dicarboxylic acid moiety, said acid moiety selected from the group consisting of maleic anhydride, maleic acid, fumaric acid and mixtures thereof; and (3) about 15 weight percent to about 55 weight percent dicyclopentadiene; and (b) wherein said unsaturated polyester is dissolved in a mixture of about 10 weight percent to about 30 weight percent styrene monomer and about 10 weight percent to about 30 weight percent methylmethacrylate monomer.

2. The resin composition of claim 1, wherein said glycols have the structure defined by:

$$H-(OCH_2-CH_2)_n-OH$$

wherein n is 1–10.

3. The resin of claim 1 further comprising at least one monomer in combination with others selected from the group consisting of: vinyl toluene, paramethylstyrene, trimethylolpropanetrimethacrylate, and butyl acrylate where the percentage of resin is in the range of 75–100 percent and the other monomers are the remaining components.

4. A formulation for a resin transfer molding composition comprising:

(a) about 30 to about 99 weight percent of a resin including, (1) about 40 weight percent to about 75 weight percent of an unsaturated polyester, said unsaturated polyester including the product of reacting dicyclopentadiene, an ethylenically unsaturated carboxylic acid moiety and glycol in concentrations of, (i) about 5 weight percent to about 45 weight percent glycols, said glycols having a structure defined by:

$$H-(OCHR-CH_2)_n-OH$$

wherein R is H or $CH_3$ and n is 1–10;

(ii) about 15 weight percent to about 55 weight percent of a ethylenically unsaturated dicarboxylic acid moiety, said acid moiety selected from the group consisting of maleic anhydride, maleic acid, fumaric acid and mixtures thereof; and (iii) about 15 weight percent to about 60 weight percent dicyclopentadiene;

(2) wherein said unsaturated polyester is dissolved in a mixture of about 10 weight percent to about 30 weight percent styrene monomer and about 10 weight percent to about 30 weight percent methylmethacrylate monomer;

(b) about 0 to about 85 weight percent of a filler;

(c) about 0 to about 2 weight percent of a promotor; and (d) about 0 to about 7 weight percent of an initiator.

5. The formulation of claim 4, further comprising from about 0 to about 20 weight percent of a thermoplastic additive.

6. The formulation of claim 4, wherein said filler is selected from the group consisting of:

hydrous aluminosilicate, alumina, silica, mica, calcium sulfate, carbon black, talc, calcium carbonate, and organic fillers.

7. The formulation of claim 4, wherein said promotor is selected from the group consisting of:

cobalt naphthanate, cobalt octoate, and other metal salts.

8. The formulation of claim 4, wherein said initiator is selected from the group consisting of:

dibenzoyl peroxide (BPO), cumyl (cumene) hydroperoxide, methyl ethyl ketone peroxide, and Azo compounds.

9. A formulation for a resin transfer molding composition comprising:

(a) about 20 to about 99 weight percent of a resin, said resin including, (1) about 40 weight percent to about 75 weight percent of an unsaturated polyester, said unsaturated polyester including the product of reacting dicyclopentadiene, an ethylenically unsaturated carboxylic acid moiety and glycol in concentrations of, (i) about 5 weight percent to about 45 weight percent glycols, said glycols having a structure defined by:

$$H-(OCHR-CH_2)_n-OH$$

wherein R is H or $CH_3$ and n is 1–10;

(ii) about 15 weight percent to about 55 weight percent of a ethylenically unsaturated dicarboxylic acid moiety, said acid moiety selected from the group consisting of maleic anhydride, maleic acid, fumaric acid and mixtures thereof; and (iii) about 15 weight percent to about 60 weight percent dicyclopentadiene;

(2) wherein said unsaturated polyester is dissolved in a mixture of about 10 weight percent to about 30 weight percent styrene monomer and about 10 weight percent to about 30 weight percent methylmethacrylate monomer;

(b) about 0 to about 85 weight percent of a filler;

(c) about 0 to about 2 weight percent of a promotor; and (d) about 0.3 to about 7 weight percent of an initiator.

10. The formulation of claim 9, further comprising about 0 to about 10 weight percent of a thermoplastic additive and about 5 to about 75 weight percent of a reinforcement.

11. The formulation of claim 9, wherein said filler is selected from the group consisting of:

hydrous aluminosilicate, alumina, silica, mica, calcium sulfate, carbon black, talc, calcium carbonate, and organic fillers.

12. The formulation of claim 9, wherein said promotor is selected from the group consisting of:

cobalt naphthanate, cobalt octoate, and other metal salts.

13. The formulation of claim 9, wherein said initiator is selected from the group consisting of:

dibenzoyl peroxide (BPO), cumyl (cumene) hydroperoxide, methyl ethyl ketone peroxide, and Azo compounds.

* * * * *